Dec. 4, 1956     L. L. SNYDER     2,773,251
BACKFLOW PREVENTION AND ALARM DEVICE
Filed Nov. 24, 1952     2 Sheets-Sheet 1
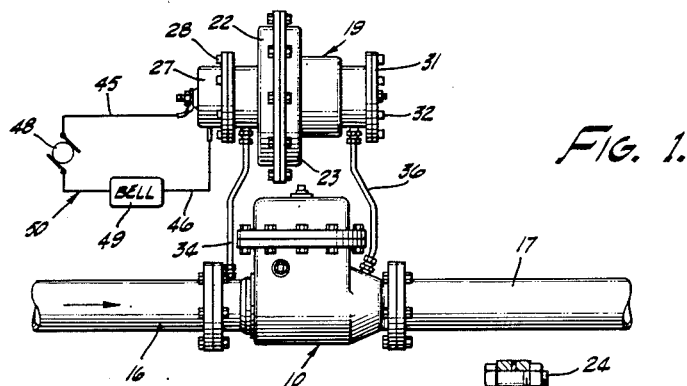
FIG. 1.
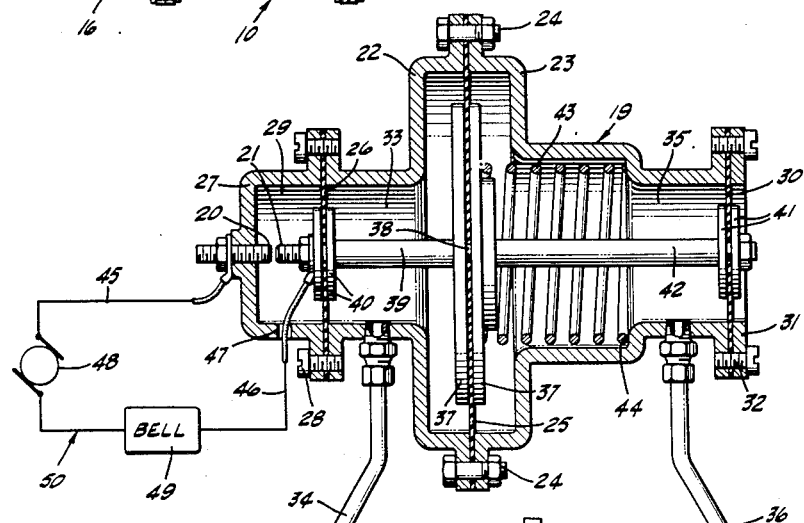
FIG. 2.
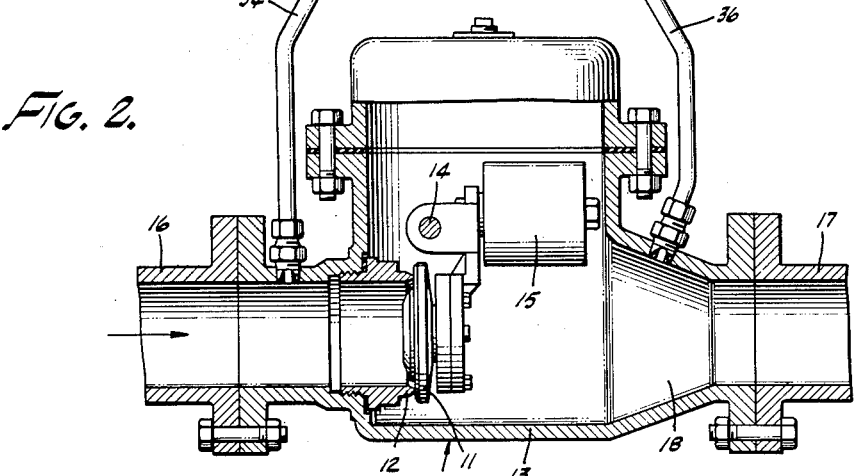
LEONARD L. SNYDER
INVENTOR.
BY *Lyon & Lyon*
ATTORNEYS Dec. 4, 1956   L. L. SNYDER   2,773,251
BACKFLOW PREVENTION AND ALARM DEVICE
Filed Nov. 24, 1952   2 Sheets-Sheet 2

LEONARD L. SNYDER
INVENTOR.

BY Lyon & Lyon
ATTORNEYS

United States Patent Office 2,773,251
Patented Dec. 4, 1956

2,773,251

BACKFLOW PREVENTION AND ALARM DEVICE

Leonard L. Snyder, Los Angeles, Calif., assignor to Backflow Engineering & Equipment Co., a copartnership Application November 24, 1952, Serial No. 322,327

5 Claims. (Cl. 340—242)

My invention relates to backflow prevention apparatus, and is particularly directed to an improved alarm device for indicating leakage in a check valve, or the presence of backflow conditions.

Commercial forms of backflow prevention apparatus commonly provide a vent chamber located between two check valves, together with suitable apparatus for venting the chamber to atmosphere whenever the pressure in the consumers line downstream from both check valves or in the zone between the check valves approaches the pressure in the supply line within predetermined limits. Backflow prevention devices of that type are often essential when it is important absolutely to prevent any return flow into the supply line from a consumers line which may be contaminated. In other installations, however, backflow into the supply line may be undesirable but it may not be absolutely necessary to prevent any small return flow. In the latter situations, the cost of the vent-type backflow prevention apparatus just described may be prohibitive. The inherent weakness of any single check or double check installation for prevention of backflow is that it is not possible readily to determine whether one or both checks are leaking in service.

It is, therefore, the principal object of my invention to provide an alarm which will signal when a check valve in a line is leaking or when backflow conditions are imminent.

It is a further object of my invention to provide a novel form of device for energizing an alarm circuit whenever the pressure downstream from the check valve approaches the pressure in the supply line within predetermined limits, whether this is occasioned by reduction of pressure in the supply line or increase in pressure in the consumers line, or both.

Another object is to provide such a device which will actuate a cutoff valve upstream from the check valve or a vent valve downstream from the check valve.

Other and related objects will appear hereinafter.

In the drawings:

Figure 1 is a side elevation showing a preferred embodiment of my invention.

Figure 2 is a sectional view thereof on an enlarged scale.

Figure 3:
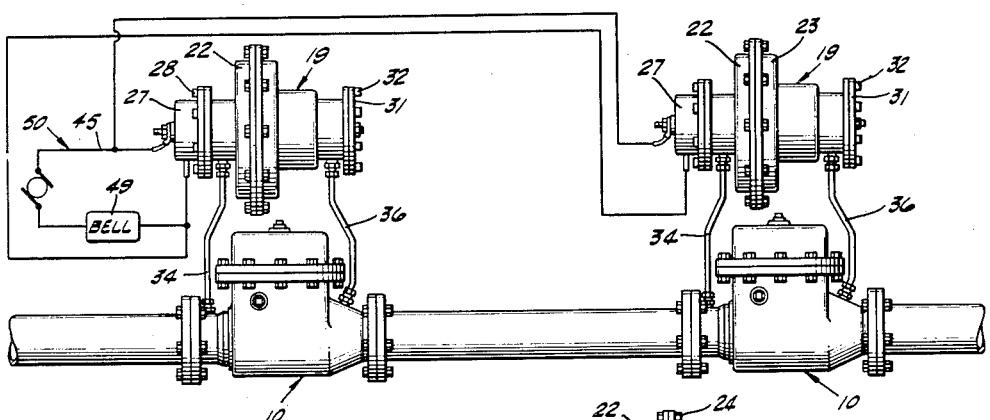
Figure 3 shows a modification in which two of the devices are connected in parallel for operating a single alarm circuit.

In each of the figures of the drawings, the control switch assembly is illustrated in greatly enlarged form for clarity.

Referring to the drawings, the check valve 10 may conveniently take the form shown in my copending application Serial No. 253,481, filed October 27, 1951, entitled Backflow Preventer. In this device, a swinging valve element 11 is positioned in the line of flow and is adapted to engage a stationary seat 12. The valve element is located within the housing 13 and is pivotally connected to the housing by means of the pivot shaft 14. A weight 15 is provided to hold the valve element 11 in sealing engagement with the seat 12 under no-flow conditions. The weight 15 has the further function of maintaining the valve element 11 in the line of flow so that a pressure differential exists between the supply conduit or line 16 and the service conduit or line 17 whenever liquid is flowing through the check valve 10 or at cessation of flow. In a particular conventional embodiment of the check valve 10, the pressure loss in the liquid flowing through the check valve is at least 2 p. s. i. In other words, the valve element 11 should seal against the seat 12 under no-flow conditions if the pressure in the supply line 16 is 60 p. s. i. and the pressure in the consumers line is 58 p. s. i. If the check valve should be faulty, however, and fail to provide a tight seal, liquid will flow from the supply line 16 to the consumers line 17. Under no-flow conditions this will cause a pressure rise within the consumers line 17 and within the chamber 18 within the housing 13. I make use of this pressure rise to energize an alarm circuit, as described below.

The differential pressure switch, generally designated 19, is adapted to close electric contacts 20 and 21 whenever the pressure in the chamber 18 approaches the supply line pressure within predetermined limits, for example, 1 p. s. i. The device 19 includes a split housing having the cooperating halves 22 and 23 connected by threaded elements 24. The diaphragm 25 is clamped between the halves 22 and 23. Since it may not be desirable to locate switch contacts within the liquid filled housing, I provide a second diaphragm 26 which is clamped between the end cap 27 and the housing part 22 by means of threaded elements 28. The space 29 within the end cap 27 is open to atmospheric pressure. I also provide a third diaphragm 30 which is clamped between the plate 31 and the housing part 23 by means of threaded fasteners 32. The diaphragms 26 and 30 have the same effective diameter, and each is exposed on one side to atmospheric pressure.

The chamber 33 between diaphragms 25 and 26 is connected by means of piping 34 to the check valve 10 at a location upstream from the seat 12. Similarly, the chamber 35 between the diaphragms 25 and 30 is connected by means of piping 36 to the chamber 18 which is downstream from the valve seat 12. The supply line pressure is therefore reflected in the chamber 33 and the consumers line pressure is reflected in the chamber 35.

Circular discs 37 are mounted on opposite sides of the diaphragm 25 and serve to reinforce it. The discs are connected at 38. A rod 39 connects one of the discs 37 to the moving contact 21. A similar pair of discs 40 is connected to the rod 39 and contact 21, and these discs are positioned at opposite sides of the diaphragm 26. Similar discs 41 clamp the diaphragm 30 between them and these discs are connected to one of the discs 37 by means of a rod 42. The diaphragm 30 serves to offset the unbalance of the diaphragm 25 caused by the presence of the diaphragm 26.

A compression spring 43 is positioned within the chamber 35, and is confined between one of the discs 37 and the shoulder 44 on the housing part 23. The spring 43 acts to move the diaphragm 25 to the left as viewed in Figure 2. The dimensions of the spring are chosen so that it exerts a force equal to the force produced by 2 p. s. i. differential acting on the diaphragm 25, and hence matches the minimum pressure drop through the check valve 10. It will be understood that the figure of 2 p. s. i. pressure drop is given by way of illustration only, and not as a limitation.

The contact 20 is adjustably mounted on the cap 27, and is connected to an electrical lead wire 45. Another electrical lead wire 46 extends through an aperture 47 in the cap 27, and is connected to the moving contact 21. The contacts 20 and 21 are brought into engagement when the rods 30 and 42 move to the left, and this engagement closes an electrical circuit through the lead wires 45 and 46, the power source 48, and the alarm device 49.

In the event that pressure in the supply line 16 should fail entirely, or that vacuum conditions should exist in the line 16, the full amount of back pressure in the consumers line 17 might be applied against the diaphragm 25 through piping 36 and chamber 35. The diaphragm 25 must, therefore, be rugged enough to withstand this rather severe differential in pressure, and yet be sufficiently sensitive to operate the rods 39 and 42 under 1 p. s. i.

The automatic operation of the apparatus shown in Figure 2 will now be described. When liquid is flowing through the supply line 16 to the consumers line 17, the valve 11 swings away from the seat 12 under the force of the moving stream of liquid. The weighted valve element, however, does not move completely out of the path of flow of liquid, and hence a pressure drop occurs through the check valve 10. Under conditions of normal flow, the pressure in chamber 18 is therefore lower than the pressure in the supply line 16 and, consequently, the pressure in the chamber 35 is less than the pressure in the chamber 33. The effective areas of the diaphragms 26 and 30 balance out, and the force acting to move the diaphragm 25 to the right is opposed by the fluid pressure acting to move it to the left, plus the force exerted by the spring 43. The contacts 20 and 21 therefore remain separated, and the alarm circuit generally designated 50 is not energized.

If, under no-flow conditions, the pressure in the consumers line 17 should approach within 2 p. s. i. of the pressure within the supply line 16, the valve element 11 closes against the seat 12. If a tight sealing engagement is achieved, no leakage occurs, and the pressure in the chamber 18 does not increase. If leakage does occur, however, under this 2 p. s. i. differential, the pressure in the chamber 18 increases. This rise in pressure in the chamber 35, supplemented by the force of the spring 43, is sufficient to overbalance the pressure in the chamber 33 and move the rods 39 and 42 to the left to close the contacts 20 and 21. This energizes the alarm circuit 50, signifying that either check valve 11 is leaking or that backflow conditions are either present or imminent.

The alarm device 49 furnishes an indication that suitable measures should be taken to prevent backflow. For example, a control valve, not shown, upstream from the check valve 10 should be closed.

If pressure in the supply line 16 should fail completely, or if vacuum conditions should exist in the supply line 16, the alarm circuit 50 will be energized. It will be noted that the alarm device is energized whenever one of the following conditions exists: (a) when positive pressure exists in the supply line 16 and in the consumers line 17 under no-flow conditions, and when the pressure in the consumers line approaches within 1 p. s. i. of the in the supply line; and (b) when pressure in the supply line 16 falls below the pressure in the consumers line 17.

In the device shown in Figure 3, two check valves 10 are connected in series and each is provided with a differential pressure switch 19. The electrical leads from the devices 19 are connected in parallel so that either or both may operate the alarm circuit 50.

Figure 4:
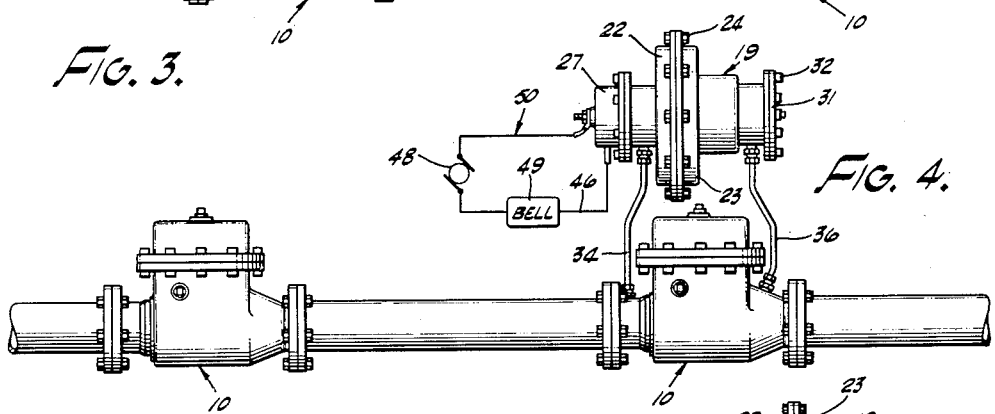
Figure 4 shows another modification in which the device is applied to the second of two check valves interposed between a supply line and a consumers line.

Figure 4 shows a pair of check valves 10 connected in series with the second check valve only provided with the differential pressure switch 19 and the alarm circuit 50. It will be understood that the differential pressure switch could be associated with the first check valve instead of the second check valve in the series.

Figure 5:
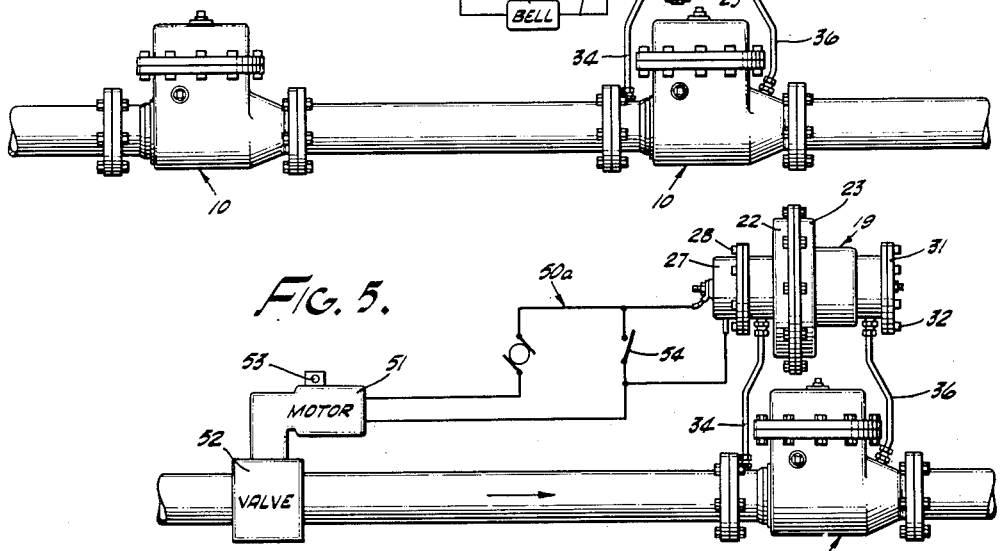
Figure 5 shows another modification in which the electric circuit operates a motorized cutoff valve upstream from the check valve.

Figure 5 shows a check valve 10 and a differential pressure switch 19, the latter having lead wires establishing an electrical circuit 50a through the motor 51 which is connected to the shutoff valve 52. The valve 52 is positioned upstream from the check valve 10. When the electrical circuit is closed by the device 19, the motor operates to close the valve. A reversing switch 53 on the motor may be manually actuated in conjunction with a manual switch 54 to reverse the rotation of the motor and thereby reopen the valve 52.

Figure 6:
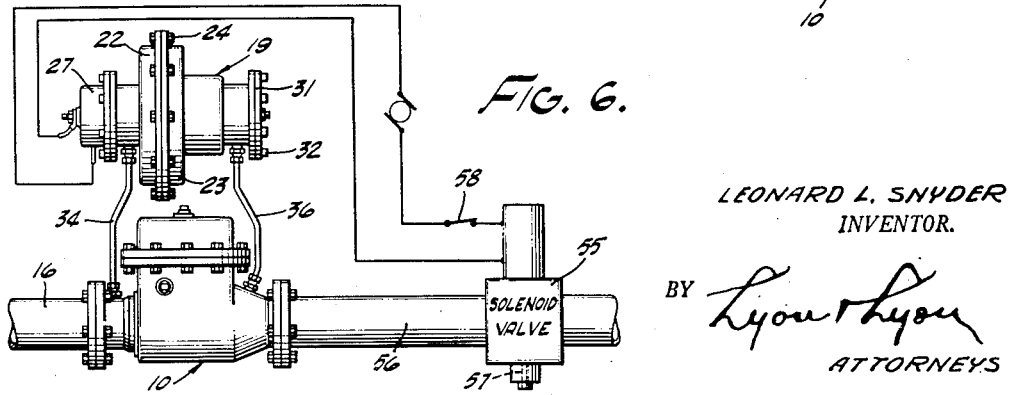
Figure 6 shows a further modification in which the electric circuit operates a solenoid valve downstream from the check valve.

In Figure 6 there is shown a solenoid valve 55 positioned downstream from the check valve 10. When the differential pressure switch 19 closes the electrical circuit through the solenoid valve 55, the valve opens to vent the pipe 56 to atmosphere through the relatively small port 57. The rate of flow through the restricted port 57 is small and hence the pressure in the pipe falls off slowly. When this pressure reaches a value slightly less (for example, 1 p. s. i. less) than the pressure in the supply line 16, the differential pressure switch 19 opens the circuit and the valve 55 closes. Also, the normally closed switch 58 may be manually opened to permit the solenoid valve to close at any time.

Having fully described my invention, it is to be understood that I do not wish to be limited to the details herein set forth but my invention is of the full scope of the appended claims.

I claim:

1. In a device for use with a check valve connecting a supply conduit to a consumers conduit, the check valve having a movable closure establishing a pressure drop from the supply conduit to the consumers conduit under conditions of normal flow therethrough and establishing a certain value of pressure differential at cessation of flow, the combination of: a differential pressure switch having a diaphragm interposed between two chambers, relatively movable electrical contact elements connected for operation by said diaphragm, piping connecting one of the said chambers to reflect pressure in the supply conduit and connecting the other of the chambers to reflect pressure in the consumers conduit, whereby the contacts are closed whenever the pressure in the consumers conduit approaches the pressure in the supply conduit within the range between zero p. s. i. differential and said certain value of pressure differential established by the movable closure at cessation of flow, and an electrical circuit having an alarm device in series with said contact elements.

2. In a device for connecting a supply conduit to a consumers conduit, the combination of: a check valve operatively interposed between the conduits, the check valve having means establishing a pressure drop from the supply conduit to the consumers conduit under conditions of normal flow therethrough and establishing a certain value of pressure differential at cessation of flow and a differential pressure switch having internal pressure chambers and having relatively movable electrical contact elements, said switch acting to close the electrical contacts whenever the pressures in the chambers approach equality within the range between zero p. s. i. differential and said certain value of pressure differential, piping connecting the said chambers of the differential pressure switch to reflect pressure in the conduits upstream and downstream from the check valve, a motor driven cutoff valve upstream from said check valve, and electrical circuit means whereby closing of said contacts may actuate the motor driven cutoff valve to closed position.

3. In a device for connecting a supply conduit to a consumers conduit, the combination of: a check valve operatively interposed between the conduits, the check valve having means establishing a pressure drop from the supply conduit to the consumers conduit under conditions of normal flow therethrough and establishing a certain value of pressure differential at cessation of flow, a differential pressure switch having internal pressure chambers and having relatively movable electrical contact elements, said switch acting to close the electrical contacts whenever the pressures in the chambers approach equality within the range between zero p. s. i. differential and said certain value of pressure differential, piping connecting the said chambers of the differential pressure switch to reflect pressures in the conduits upstream and downstream from the check valve, an electrically operated vent valve downstream from the check valve adapted to open a port to vent the consumers line to atmosphere, and electrical circuit means whereby closing of the contacts may actuate the vent valve.

4. In a device for connecting a supply conduit to a consumers conduit, the combination of: a check valve operatively interposed between the conduits, the check valve having means establishing a pressure drop from the supply conduit to the consumers conduit under conditions of normal flow therethrough and establishing a certain value of pressure differential at cessation of flow, a differential pressure switch having relatively movable electrical contact elements, and piping connecting the said differential pressure switch to reflect pressures in the conduits upstream and downstream from the check valve, whereby the contacts are closed whenever the differential pressure between the conduits enters the range between zero p. s. i. differential and said certain value of pressure differential.

5. In a device for connecting a supply conduit to a consumers conduit, the combination of: a check valve operatively interposed between said conduits, the check valve having a movable closure, bias means acting on said movable closure to establish a pressure drop from the supply conduit to the consumers conduit under conditions of normal flow therethrough and establishing a certain value of pressure differential at cessation of flow, a differential pressure switch having first and second chambers, an element movable in response to the pressure differential between said chambers, relatively movable electrical contact elements connected for operation by said element, first conduit means connecting one of said chambers to reflect pressure in the supply conduit upstream from the check valve, and second conduit means connecting the other chamber to reflect pressure in the consumers conduit downstream from the check valve, resilient means acting to move said element in the same direction as the force produced by pressure in the second chamber, the force of the resilient means as related to the force of the bias means being such as to close the contacts whenever the pressure differential between said conduits enters the range between zero p. s. i. differential and said certain value of pressure differential.

References Cited in the file of this patent

UNITED STATES PATENTS

| | | |
|---|---|---|
| 358,949 | Stern | Mar. 8, 1887 |
| 1,125,407 | Shipman | Jan. 19, 1915 |
| 1,940,346 | Edwards | Dec. 19, 1933 |
| 2,200,310 | Thayer et al. | May 14, 1940 |
| 2,320,368 | Leathers | June 1, 1943 |
| 2,430,122 | Grace | Nov. 4, 1947 |
| 2,497,375 | Seguin et al. | Feb. 14, 1950 |